(12) United States Patent
Yashiro et al.

(10) Patent No.: US 11,008,042 B2
(45) Date of Patent: May 18, 2021

(54) VEHICLE BODY FRONT STRUCTURE

(71) Applicant: SUZUKI MOTOR CORPORATION, Hamamatsu (JP)

(72) Inventors: Hironao Yashiro, Hamamatsu (JP); Tatsuya Manabe, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 81 days.

(21) Appl. No.: 16/661,538

(22) Filed: Oct. 23, 2019

(65) Prior Publication Data

US 2020/0148268 A1  May 14, 2020

(30) Foreign Application Priority Data

Nov. 8, 2018  (JP) .............................. JP2018-210369

(51) Int. Cl.
 B62D 21/00 (2006.01)
 B62D 21/15 (2006.01)

(52) U.S. Cl.
 CPC ................... B62D 21/152 (2013.01)

(58) Field of Classification Search
 CPC ................................... B62D 21/152
 See application file for complete search history.

(56) References Cited

U.S. PATENT DOCUMENTS

| 9,663,050 B2* | 5/2017 | Nishida | B62D 25/082 |
| 9,676,417 B2* | 6/2017 | Yamada | B60R 19/12 |
| 2015/0274208 A1* | 10/2015 | Segawa | B62D 25/085 180/232 |
| 2015/0344071 A1* | 12/2015 | Nakano | B62D 25/04 296/187.09 |
| 2016/0046250 A1* | 2/2016 | Sotoyama | B62D 21/152 293/155 |
| 2018/0244320 A1* | 8/2018 | Fukuoka | B62D 25/165 |
| 2018/0345777 A1* | 12/2018 | Birnschein | B60L 50/50 |

FOREIGN PATENT DOCUMENTS

| JP | 2015-147458 A | 8/2015 |
| JP | 2015-214244 A | 12/2015 |

* cited by examiner

*Primary Examiner* — Lori L Lyjak
(74) *Attorney, Agent, or Firm* — Stein IP, LLC

(57) ABSTRACT

It is an object to provide a vehicle body front structure capable of uniformly deforming a colliding object and achieving a high score in the MPDB frontal impact test. Features of a vehicle body front structure according to the present invention lie in including a front side member extending in a front-rear direction on a side of a power unit mounting room located in a front part of a vehicle, a first member fixed to a front end of the front side member and extending in a vertical direction; and a second member arranged on an outer side of the first member in a vehicle width direction, wherein a front face of the first member is a flat face, and the second member is connected to the first member below the front side member, inclines upward as the second member extends rearward relative to the vehicle from a portion at which the second member is connected to the first member, and is also connected to a vehicle body above the front side member.

4 Claims, 8 Drawing Sheets

VEHICLE BODY FRONT STRUCTURE

CROSS-REFERENCE TO RELATED APPLICATION

This application is based upon and claims the benefit of priority from the prior Japanese Patent Application No. 2018-210369, filed on Nov. 8, 2018, the entire contents of which are incorporated herein by reference.

FIELD

The present invention relates to a vehicle body front structure.

BACKGROUND

For example, Japanese Patent Laid-Open Publication No. 2015-214244 discloses a vehicle body front structure in which left and right upper members extend from left and right front pillars toward the vehicle body front side. In the vehicle body front structure in Japanese Patent Laid-Open Publication No. 2015-214244, each of the upper members has an L-shaped portion formed on the front pillar side of its rear end portion. The L-shaped portion has a rear inclined portion that is arranged on the front pillar side, and a front inclined portion that is connected to a front end of the rear inclined portion. In Japanese Patent Laid-Open Publication No. 2015-214244, the L-shaped portion has a front inclined portion and a rear inclined portion, and a pillar bulging portion of the front pillar is joined to an inner face of the rear inclined portion that opposes the front inclined portion. According to Japanese Patent Laid-Open Publication No. 2015-214244, this configuration makes it possible to prevent the joint portion being damaged due to an impact load, without increasing welding portions.

In recent years, the EU assessment (European New Car Assessment Program; ENCAP) has been implemented to evaluate the safety of vehicle bodies. The EU assessment is scheduled to newly employ the MPDB (Mobile Progressive Deformable Barrier) frontal impact test as an offset frontal impact testing standard, after the year 2020. In the MPDB frontal impact test, a vehicle and a colliding object (barrier) are moved at 50 km/h to cause an offset collision therebetween, and it is evaluated whether both occupant protection and the degree of damaging the opposite vehicle are at a sufficient level (i.e. whether the compatibility of the vehicle is at a sufficient level), based on whether or not the colliding object (barrier) collapses (deforms) uniformly, and on the amount of absorbed energy, for example.

In the aforementioned MPDB frontal impact test, a low evaluation is given if the colliding object does not deform uniformly, that is, if the colliding object deforms locally. For this reason, vehicles are required to have a structure that uniformly deforms a colliding object in case of collision. However, whereas Japanese Patent Laid-Open Publication No. 2015-214244 gives consideration to prevention of damaging to the joint portion due to an impact load, it gives no consideration to uniformly deforming a colliding object. Accordingly, there is room for further improvement in the technology described in Japanese Patent Laid-Open Publication No. 2015-214244.

In view of the foregoing problem, the present invention aims to provide a vehicle body front structure capable of uniformly deforming a colliding object and achieving a high score in the MPDB frontal impact test.

SUMMARY OF THE DISCLOSURE

To solve the foregoing problem, features of a representative configuration of a vehicle body front structure according to the present invention lie in that a vehicle body front structure that includes a front side member extending in a front-rear direction on a side of a power unit mounting room located in a front part of a vehicle, also includes: a first member fixed to a front end of the front side member and extending in a vertical direction: and a second member arranged on an outer side of the first member in a vehicle width direction, wherein a front face of the first member is a flat face, and the second member is connected to the first member below the front side member, inclines upward as the second member extends rearward relative to the vehicle from a portion at which the second member is connected to the first member, and is also connected to a vehicle body above the front side member.

According to the present invention, a vehicle body front structure can be provided that is capable of uniformly deforming a colliding object and achieving a high score in the MPDB frontal impact test.

DETAILED DESCRIPTION

Figure 1:
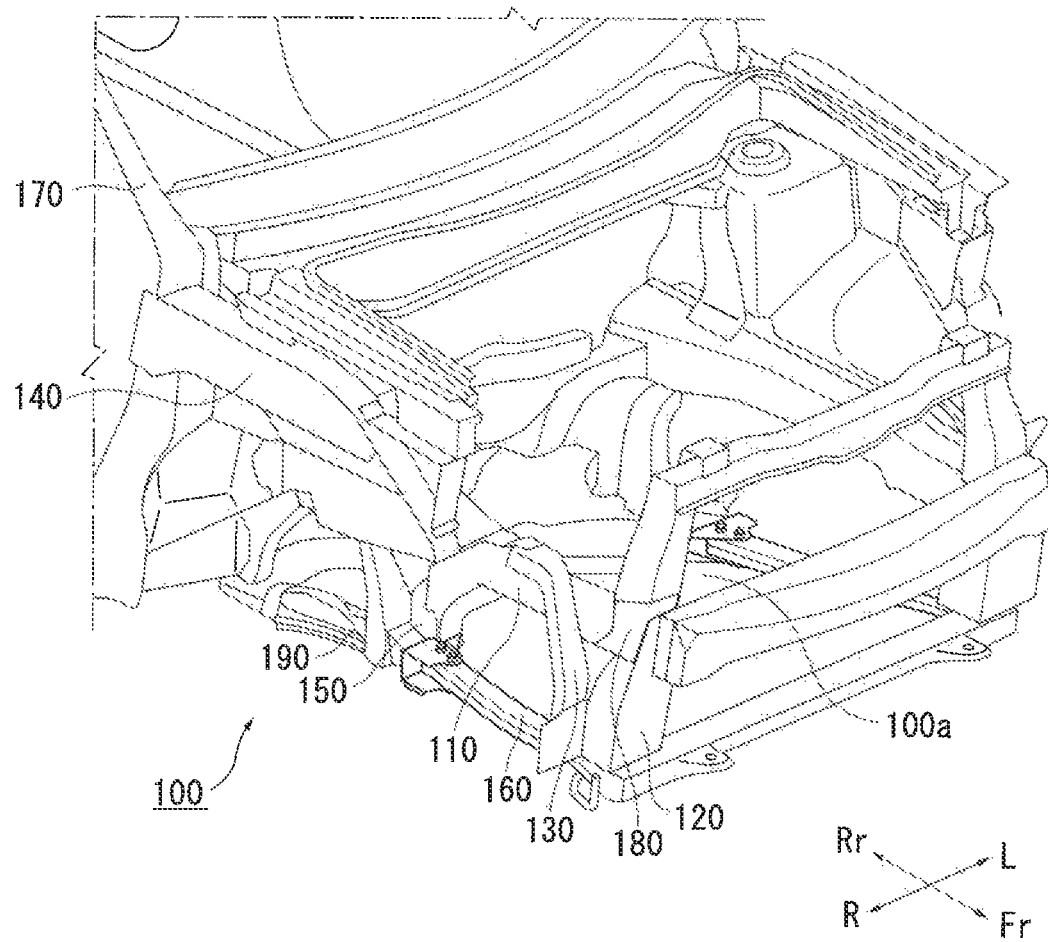
FIG. 1 is an overall perspective view of a vehicle body front structure according to an embodiment of the present invention.

A vehicle body front structure according to an embodiment of the present invention is a vehicle body front structure that includes a front side member extending in a front-rear direction on a side of a power unit mounting room located in a front part of a vehicle, the vehicle body front structure also including: a first member fixed to a front end of the front side member and extending in a vertical direction; and a second member arranged on an outer side of the first member in a vehicle width direction, wherein a front face of the first member is a flat face, and the second member is connected to the first member below the front side member, inclines upward as the second member extends rearward relative to the vehicle from a portion at which the second member is connected to the first member, and is also connected to a vehicle body above the front side member.

According to the above configuration, when a collision, particularly an offset collision occurs, an impact load applied from the front to either a left or right end portion of a vehicle front face can be received at the flat front face of the first member and a front face of the second member. Thus, a colliding object can be received over a wider area, making it possible to prevent the impact load from concentrating on a local region of the colliding object. Accordingly, the colliding object can be deformed uniformly, and a high score can be achieved in the MPDB frontal impact test while reducing the injuries of the colliding object.

This vehicle body front structure further includes a third member arranged on an outer side of the second member in the vehicle width direction and rearward of the second member, wherein the third member is connected to a rear end of the second member, inclines upward as the third member extends rearward relative to the vehicle from a portion at which the third member is connected to the second member, and is also connected to the vehicle body above the rear end of the second member. According to this configuration, a colliding object can also be received at a front face of the third member, in addition to the flat front face of the first member and the front face of the second member. Accordingly, the colliding object can be received over a yet wider area, and the aforementioned effect can thus be enhanced.

This vehicle body front structure further includes a suspension frame arranged below the front side member; and a reinforcing member extending in a vehicle front-rear direction between the first member and the suspension frame below the front side member, wherein a front end of the reinforcing member is connected to a lower end of the first member, a rear end of the reinforcing member is connected to the vehicle body or the suspension frame, and the reinforcing member extends parallel to an inclined portion of the second member as viewed from above.

According to this configuration, when a collision occurs, the reinforcing member enters a state of stretching between the first member and the vehicle body (or the suspension frame). As a result, the first member is supported by the vehicle body (or the suspension frame) via the reinforcing member, and thus, the first member is kept from inclining in the vehicle front-rear direction due to a collision load. Accordingly, the orientation of the first member can be maintained preferably, and the effect of receiving the colliding with the first member is achieved reliably.

The third member inclines upward as the third member extends rearward relative to the vehicle from the portion at which the third member is connected to the second member, further extends in a horizontal direction, and is then connected to the vehicle body, the rear end of the reinforcing member is connected to the suspension frame, the reinforcing member has a first readily-bendable portion and a second readily-bendable portion that are spaced apart from each other in the vehicle front-rear direction and are more bendable than portions therearound, and a third readily-bendable portion that is formed at a portion at which the reinforcing member is connected to the suspension frame and is more bendable than portions therearound, a rear end of the front side member is connected to the vehicle body, the front side member has: a front portion; an intermediate portion continuous with a rear side of the front portion; a rear portion continuous with a rear side of the intermediate portion; a reinforcing shape formed in each of the front portion and the rear portion and extending in the vehicle front-rear direction; and a fragile shape formed in each of the intermediate portion and a rear end of the rear portion, the fragile shape extending in the vertical direction and being more fragile than portions therearound, a leading end of the front side member, a leading end of the second member, and the first readily-bendable portion of the reinforcing member are arranged at the same position in the vehicle front-rear direction, a boundary between an inclined portion and a horizontal portion of the third member, the fragile shape in the rear end of the rear portion of the front side member, and the third readily-bendable portion of the reinforcing member are arranged at the same position in the vehicle front-rear direction, and the portion at which the third member is connected to the second member, a boundary between the intermediate portion and the rear portion of the front side member, and the second readily-bendable portion of the reinforcing member are located in this order from front.

According to this configuration, the shape, arrangement, and timing of deformation of the aforementioned members are optimized. Thus, a more uniform colliding form can be achieved, and the above-described effect can be enhanced.

EMBODIMENTS

Hereinafter, a preferable embodiment of the present invention will be described in detail with reference to the attached drawings. Dimensions, materials, other specific values, and the like described in this embodiment are merely examples for facilitating understanding of the invention, and are not intended to limit the present invention unless stated otherwise. Note that in the present specification and drawings, elements having substantially the same functions and configurations will be assigned the same reference numerals to omit redundant descriptions, and elements that do not directly relate to the present invention will be omitted in the drawings.

Figure 2:
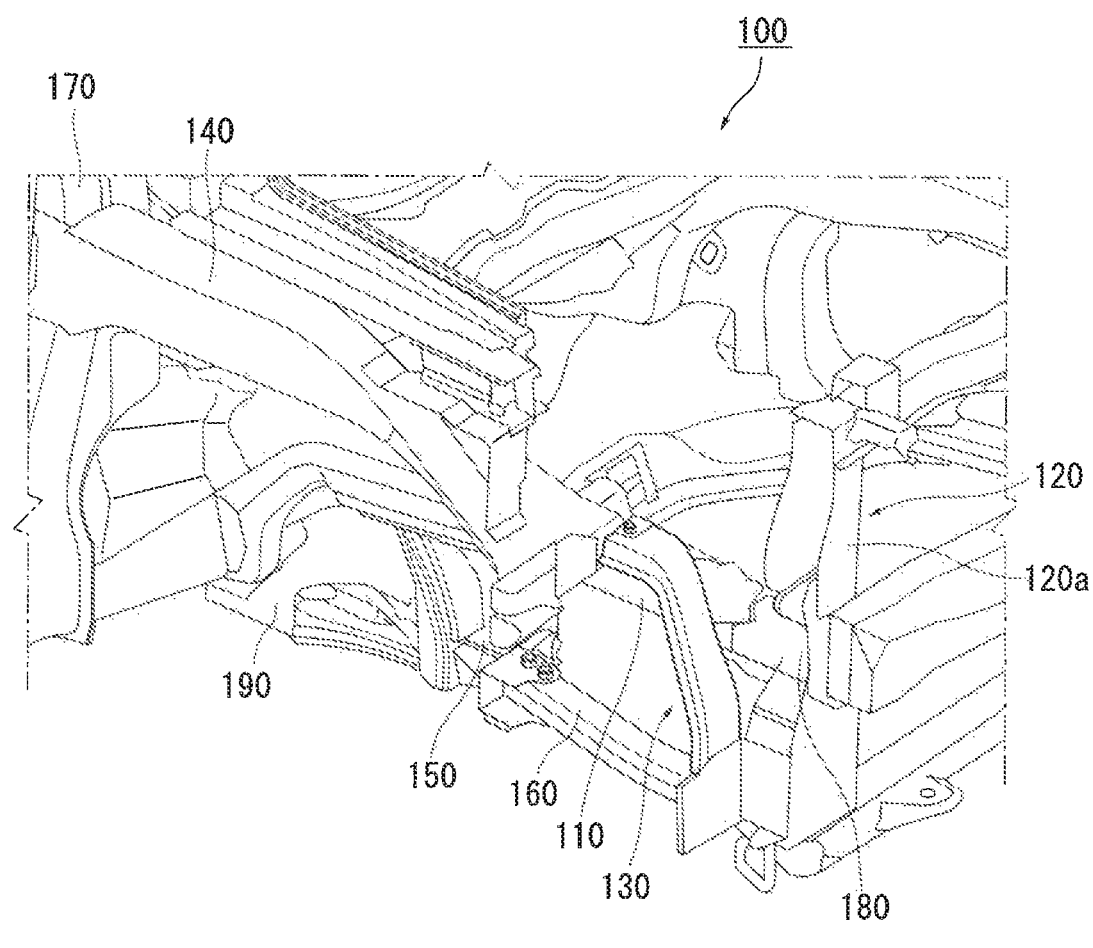
FIG. 2 is an enlarged view of the vehicle body front structure in FIG. 1.

FIG. 1 is an overall perspective view of a vehicle body front structure 100 according to the present embodiment. FIG. 2 is an enlarged view of the vehicle body front structure 100 in FIG. 1. Note that, although the present embodiment will be described while taking the right side of the vehicle body (the entirety of which is not shown in the diagrams) as an example, the present invention is also applicable to the left side of the vehicle body. In the diagrams used in the following description, the frontward, rearward, leftward, rightward, upward, and downward directions with respect to an occupant are denoted as Fr, Rr, L, R, Up, and Down, respectively, as needed.

As shown in FIGS. 1 and 2, the vehicle body front structure 100 according to the present embodiment includes a front side member 110, a first member 120, and a second member 130. The front side member 110 is a member that extends in the front-rear direction on a side of a power unit mounting room 100a, which is located in a front part of the vehicle, and a rear end of the front side member 110 is connected to a side body 170, which constitutes the vehicle body.

The first member 120 is a member that is fixed to a front end of the front side member 110 and extends in the vertical direction. In the present embodiment, the first member 120 is a radiator support brace. The second member 130 is a member that is arranged on the outer side of the first member 120 in the vehicle width direction. In the present embodiment, the second member 130 is a fender apron front member.

Note that the present embodiment will take, as an example, a configuration in which the first member 120 is fixed via a front side member fixing portion 180 to the front side member 110, However, this need not be the case, and the first member 120 may alternatively be directly fixed to the front side member 110.

Figure 3:
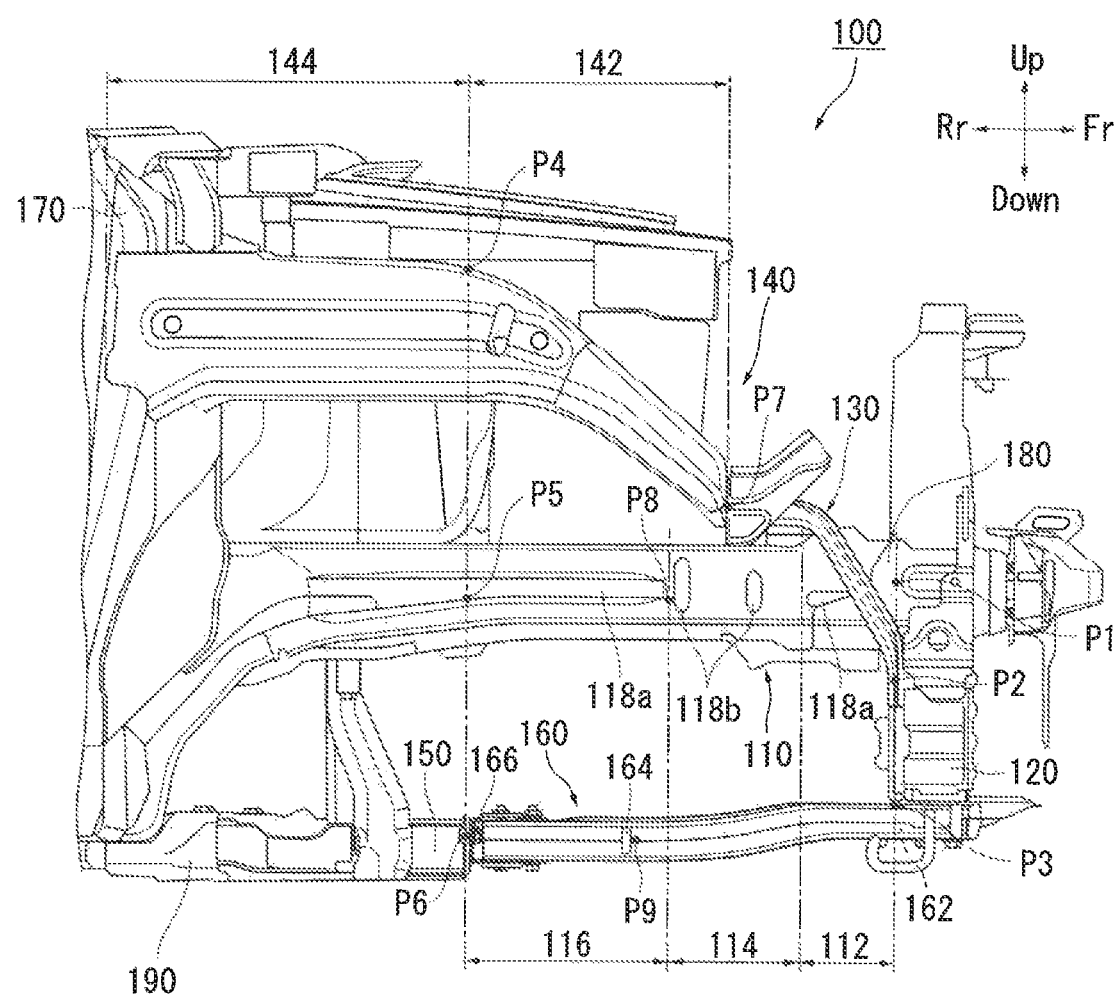
FIG. 3 shows a state of the vehicle body front structure in FIG. 1 as observed from a vehicle outer side.

As a feature of the vehicle body front structure 100 according to the present embodiment, a front face 120a of the first member 120 is a flat face that extends in the vertical direction, as shown in FIG. 2. More specifically, the front face 120a is a flat face that expands in the left-right direction relative to the cross section of the front side member 110, and is a flat face whose width increases downward. The second member 130 is connected to the first member 120 below the front side member 110, as shown in FIG. 3. The second member 130 inclines upward as it extends rearward relative to the vehicle from the portion at which the second member 130 is connected to the first member 120. A rear end of the second member 130 is connected via a later-described third member 140 to the side body 170, which constitutes the vehicle body, above the front side member 110.

According to the above configuration, when a collision, particularly an offset collision occurs, an impact load applied from the front to a right end portion of a vehicle front face can be received by the flat front face 120a of the first member 120 and a front face of the second member 130. Thus, a colliding object can be received over a wider area, making it possible to prevent the impact load from concentrating on a local region of the colliding object. Accordingly, the colliding object can be deformed more uniformly, and a higher score can be achieved in the MPDB frontal impact test.

As mentioned above, the vehicle body front structure 100 according to the present embodiment further includes the third member 140 in addition to the first member 120 and the second member 130. As shown in FIG. 2, the third member 140 is a member that is arranged on the outer side of the second member 130 in the vehicle width direction and rearward of the second member 130. In the present embodiment, the third member 140 is a cowl side outer member.

Figure 4:
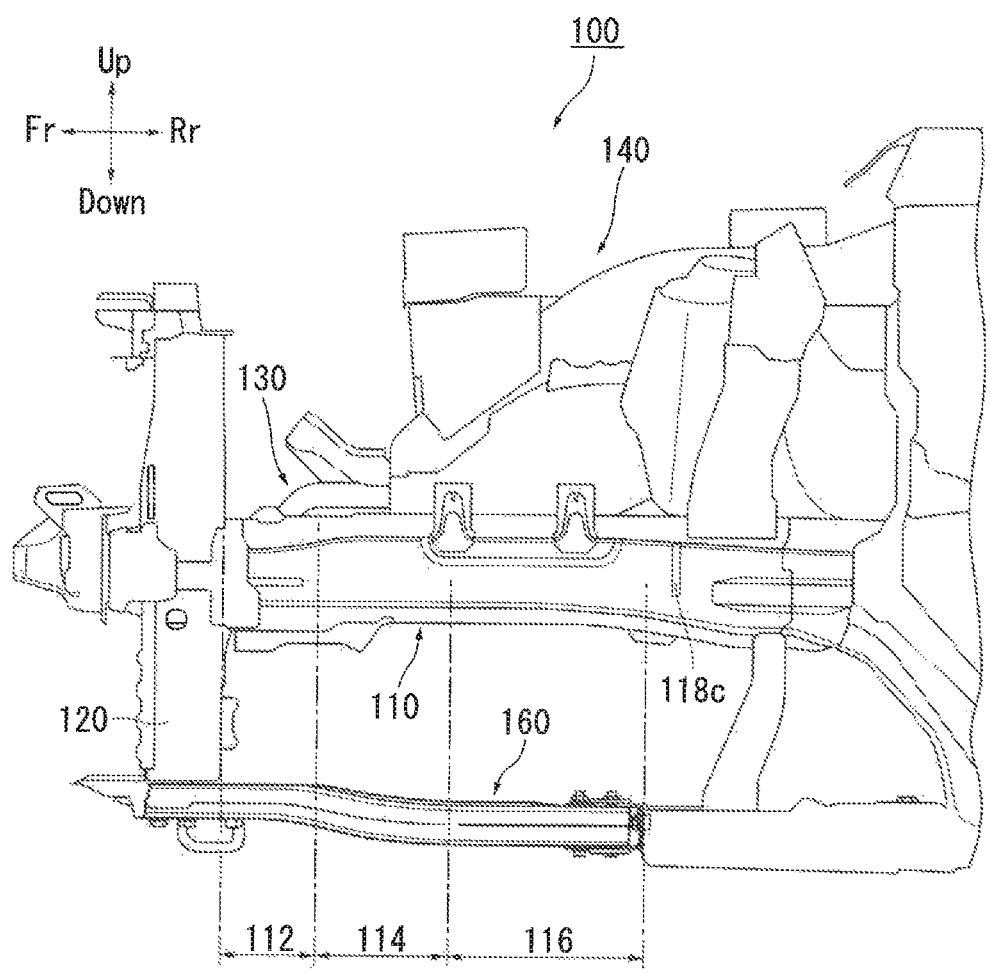
FIG. 4 shows a state of the vehicle body front structure in FIG. 1 as observed from a vehicle inner side.

FIG. 3 shows a state of the vehicle body front structure 100 in FIG. 1 as observed from the vehicle outer side. FIG. 4 shows a state of the vehicle body front structure in FIG. 1 as observed from the vehicle inner side. As shown in FIG. 3, a front end of the third member 140 is connected to the rear end of the second member 130, and the third member 140 inclines upward as it extends rearward relative to the vehicle from the connecting portion. A rear end of the third member 140 is connected, above the rear end of the second member 130, to the side body 170, which constitutes the vehicle body.

According to the above configuration, a colliding object can also be received by a front face of the third member 140, in addition to the front face 120a of the first member 120 and the front face of the second member 130. Accordingly, the colliding object can be received over a wider area, and the aforementioned effect can thus be enhanced.

In particular, in the present embodiment, the first member 120, the second member 130, and the third member 140 are arranged in this order from the vehicle front side toward the vehicle rear side. Thus, an impact load can be absorbed sequentially by these members in the vehicle front-rear direction. Accordingly, the total amount of absorbed impact can be increased, and meanwhile, each of these members reliably deforms and makes it possible to distribute the impact load. As a result, the impact can be damped over a wider area, and injuries of the colliding object can be reduced.

FIG. 3 is referred to again. The vehicle body front structure 100 according to the present embodiment further includes a suspension frame 150 and a reinforcing member 160 in addition to the aforementioned members. The suspension frame 150 is a member that is arranged below the front side member 110 and supports a suspension arm 190. The reinforcing member 160 is a member that extends in the vehicle front-rear direction between the first member 120 and the suspension frame 150 below the front side member 110.

A front end of the reinforcing member 160 is connected to a lower end of the first member 120, and a rear end of the reinforcing member 160 is connected to the suspension frame 150. Thus, when a collision occurs, the reinforcing member 160 enters a state of stretching between the first member 120 and the suspension frame 150. Accordingly, the first member 120 is supported via the reinforcing member 160 by the suspension frame 150, and is kept from inclining in the vehicle front-rear direction due to a collision load. As a result, the orientation of the front face 120a of the first member 120 can be maintained preferably, and the effect of receiving a colliding object with the first member 120 can be achieved reliably.

Note that, although the present embodiment describes, as an example, a configuration in which the rear end of the reinforcing member 160 is connected to the suspension frame 150, this need not be the case. The same effect as above can also be achieved by a configuration in which the reinforcing member 160 is directly joined to a vehicle body structure member, or a configuration in which the reinforcing member 160 is indirectly connected to a vehicle body structure member via the suspension frame 150.

Figure 5:
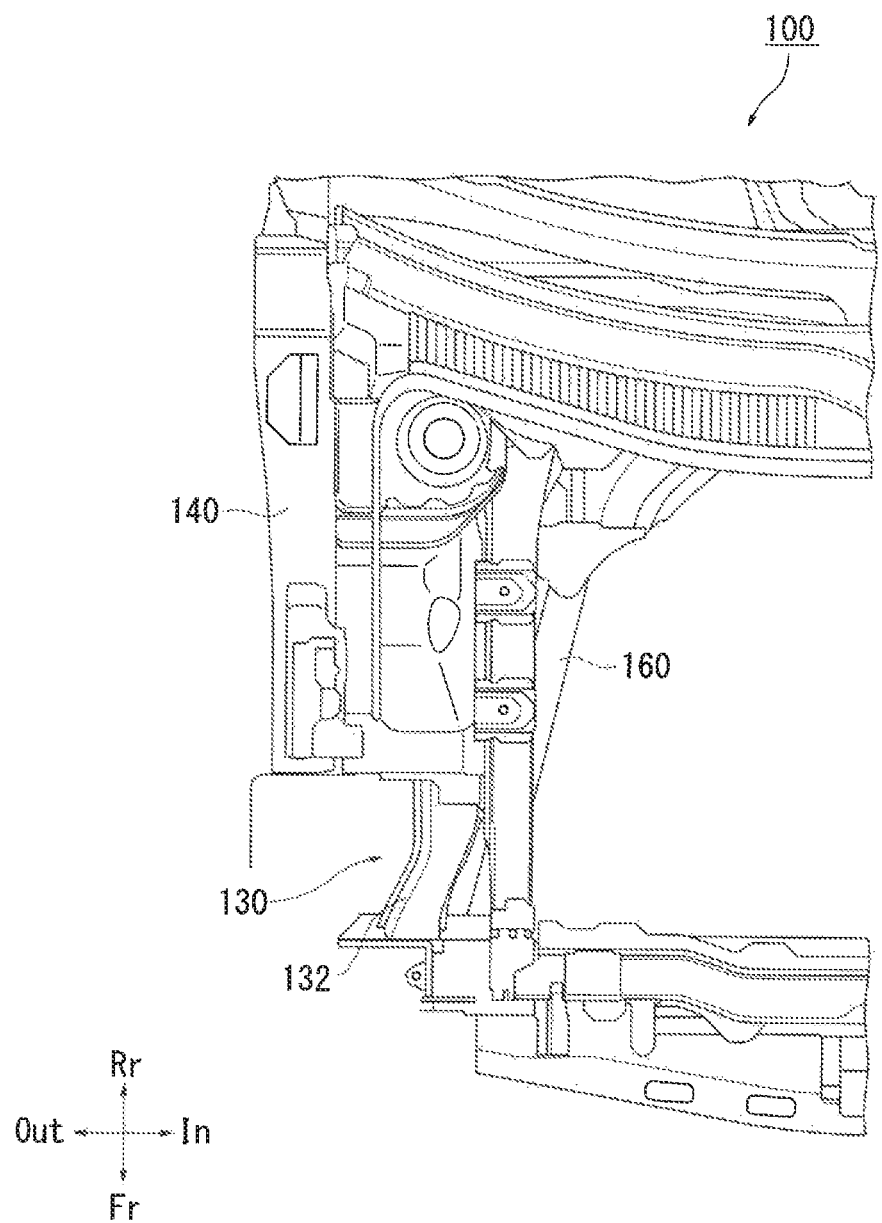
FIG. 5 is a plan view showing a state of the vehicle body front structure in FIG. 1 as observed from above.
Figure 6:
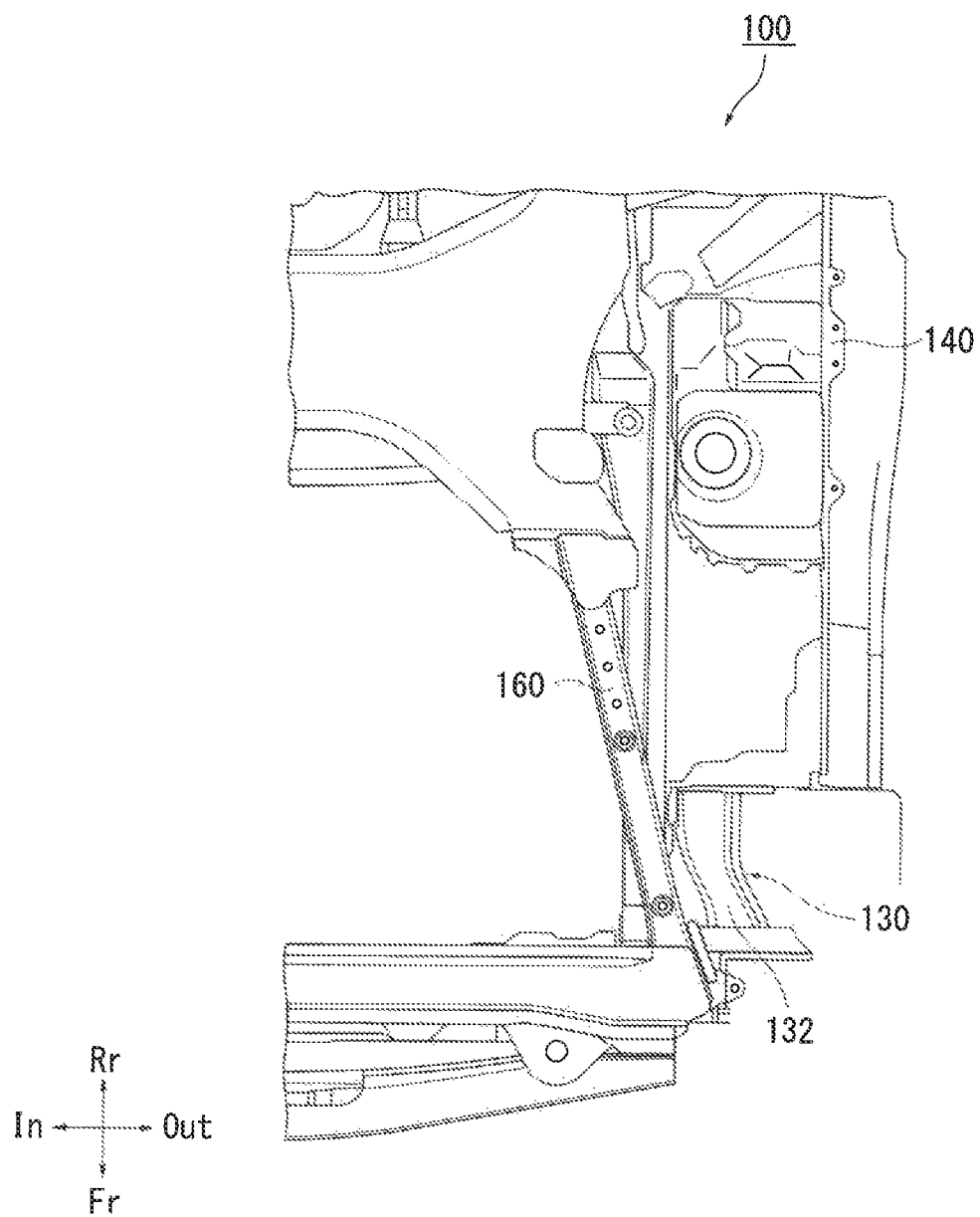
FIG. 6 is a plan view showing a state of the vehicle body front structure in FIG. 1 as observed from below.

FIG. 5 is a plan view showing a state of the vehicle body front structure 100 in FIG. 1 as observed from above. FIG. 6 is a plan view showing a state of the vehicle body front structure 100 in FIG. 1 as observed from below. As shown in FIGS. 5 and 6, the reinforcing member 160 extends parallel to an inclined portion 132 of the second member 130 as viewed from above and below. Thus, the direction in which a collision load is input to the reinforcing member 160 can be aligned with the direction in which the collision load is input to the inclined portion 132 of the second member 130. Accordingly, the aforementioned effect can be enhanced.

Next, the details of the third member 140, the reinforcing member 160, and the front side member 110 will be described. As shown in FIG. 3, the third member 140 inclines upward as it extends rearward relative to the vehicle from the portion at which the third member 140 is connected to the second member 130, further extends in the horizontal direction, and is then connected to the side body 170, which constitutes the vehicle body.

The reinforcing member 160 has three readily-bendable portions. A first readily-bendable portion 162 and a second readily-bendable portion 164 shown in FIG. 3 are portions that are spaced apart from each other in the vehicle front-rear direction and are more bendable than portions therearound.

Figure 7:
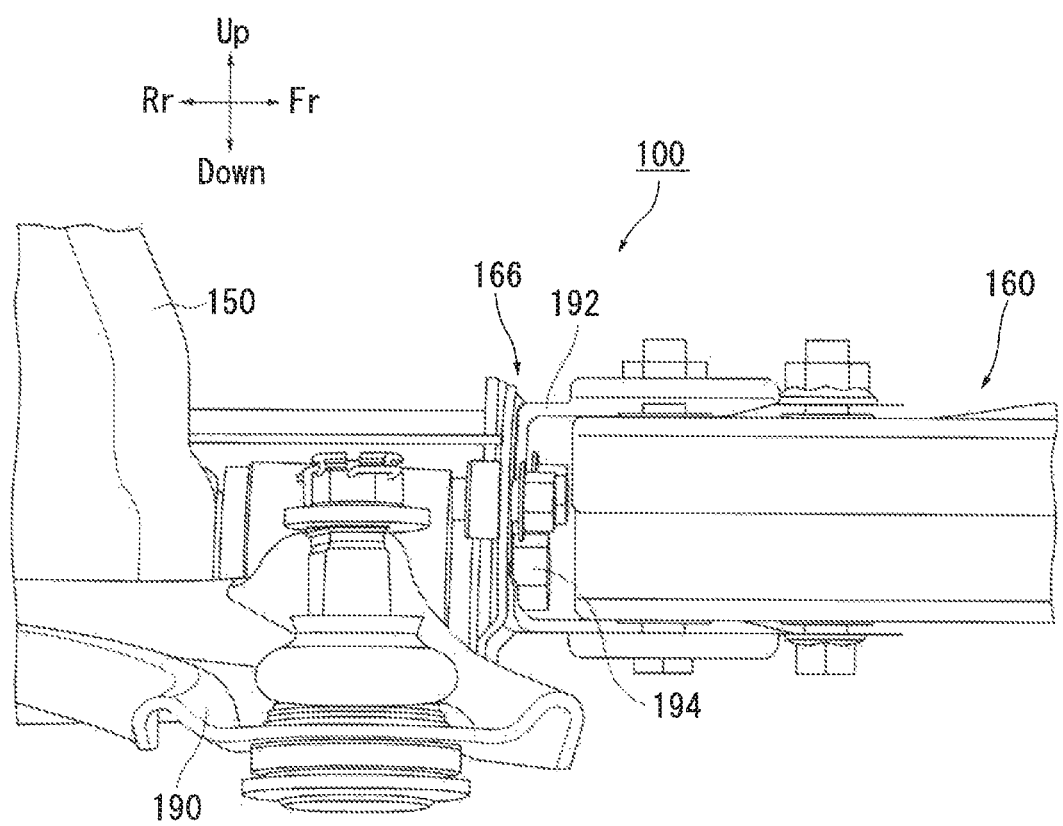
FIG. 7 is an enlarged view of a region around a third readily-bendable portion in FIG. 3.
Figure 8:
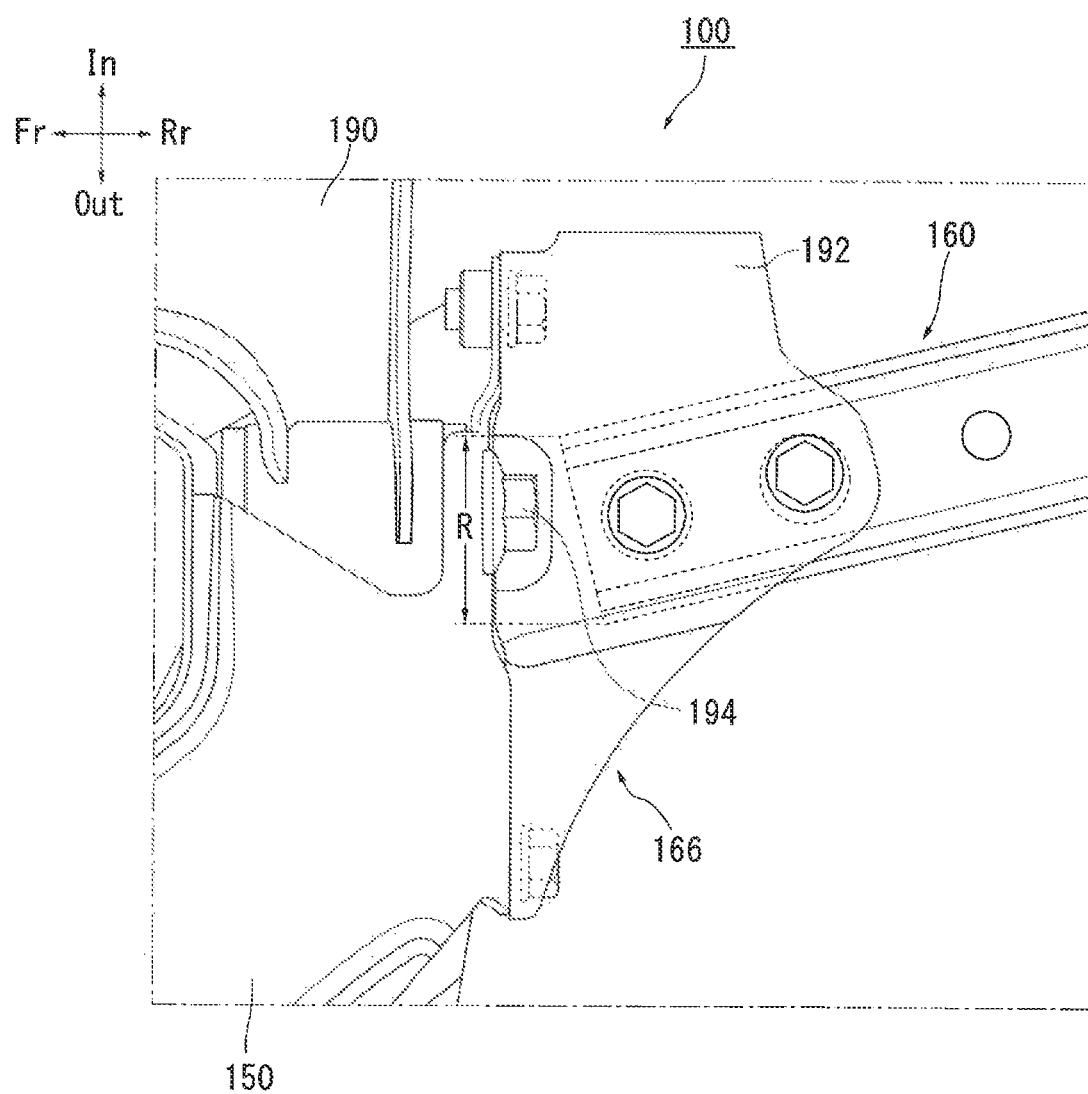
FIG. 8 shows a state of the region around the third readily-bendable portion in FIG. 7 as observed from below.

FIG. 7 is an enlarged view of a region around a third readily-bendable portion 166 in FIG. 3. FIG. 8 shows a state of the region around the third readily-bendable portion 166 in FIG. 7 as observed from below. The third readily-bendable portion 166 shown in FIGS. 7 and 8 is a portion that is formed at a portion connected to the suspension frame 150 and is more bendable than portions therearound. However, the third readily-bendable portion 166 is less bendable than the first readily-bendable portion 162 and the second readily-bendable portion 164.

Specifically, as shown in FIGS. 7 and 8, the rear end of the reinforcing member 160 and a front end of the suspension frame 150 are connected to each other by a holding bracket 192 at the third readily-bendable portion 166. Furthermore, as shown in FIG. 8, a support bolt 194 of the suspension arm 190 that has a rotary shaft arranged in the front-rear direction is disposed at a position that is hidden in an area R of the cross section of the reinforcing member 160.

As shown in FIG. 8, due to the width of the holding bracket 192 being greater than the width of the reinforcing member 160, the third readily-bendable portion 166 is less bendable than the first readily-bendable portion 162 and the second readily-bendable portion 164. This configuration makes it possible to reliably deform the first readily-bendable portion 162 and the second readily-bendable portion 164.

Also, since the support bolt 194 is disposed at a position that is hidden in the area R of the cross section of the reinforcing member 160, if the reinforcing member 160 withdraws when a collision occurs, an opening at the rear end of the reinforcing member 160 covers a head portion of the support bolt 194. Thus, when a load is applied from the front, the rear end of the reinforcing member 160 can be supported by the support bolt 194. As a result, the position of the rear end of a load path is not likely to be shifted, and it is therefore possible to suppress displacement of the rear end of the reinforcing member 160 and reliably cause bending deformation of the reinforcing member 160.

The front side member 110 has a front portion 112, an intermediate portion 114, and a rear portion 116. The front portion 112 is a portion that extends rearward relative to the vehicle in a predetermined area from a portion at which the front portion 112 is connected to the first member 120. The intermediate portion 114 is a portion that extends rearward relative to the vehicle in a predetermined area continuously from the rear side of the front portion 112. The rear portion 116 is a portion that extends rearward relative to the vehicle in a predetermined area continuously from the rear side of the intermediate portion 114.

A reinforcing shape 118a, which extends in the vehicle front-rear direction, is formed in each of the front portion 112 and the rear portion 116 of the front side member 110. Thus, the front portion 112 and the rear portion 116 are kept from deforming in the vehicle front-rear direction when a collision load is applied thereto. Meanwhile, a fragile shape 118b, which extends in the vertical direction and is more fragile than portions therearound, is formed in a vehicle outer-side face portion of the intermediate portion 114 of the front side member 110. Also, as shown in FIG. 4, a fragile shape 118c, which extends in the vertical direction and is more fragile shape than portions therearound, is formed in a vehicle inner-side face portion of the rear end of the rear portion 116 of the front side member 110. This configuration promotes deformation in the vertical direction at the intermediate portion 114 and the rear end of the rear portion 116, when a collision load is applied thereto. When a collision occurs, a front side member deforms and protrudes to the vehicle inner side in the area with the fragile shape 118b and protrudes to the vehicle outer side in the area with the fragile shape 118c.

As a feature of the present embodiment, a leading end P1 of the front side member 110, a leading end P2 of the second member 130, and the first readily-bendable portion 162 (position P3) of the reinforcing member 160 are arranged at the same position in the vehicle front-rear direction, as shown in FIG. 3. Also, a boundary P4 between an inclined portion 142 and a horizontal portion 144 of the third member 140, a fragile shape P5 at the rear end of the rear portion 116 of the front side member 110, and the third readily-bendable portion 166 (position P6) of the reinforcing member 160 are arranged at the same position in the vehicle front-rear direction. This configuration can optimize the timing of deformation of each member in the vehicle front-rear direction.

Furthermore, in the vehicle body front structure 100, a portion P7 at which the third member 140 is connected to the second member 130, a boundary P8 between the intermediate portion 114 and the rear portion 116 of the front side member 110, and the second readily-bendable portion 164 (position P9) of the reinforcing member are located in this order from the front. With this configuration, when a collision occurs, deforming positions are shifted rearward relative to the vehicle, in the vehicle downward direction. Accordingly, the front face 120a of the first member 120 can be effectively kept from inclining, and a colliding object can be favorably received.

Although preferable embodiment of the present invention has been described above with reference to the attached drawings, it goes without saying that the present invention is not limited to the above-described examples. It is apparent that a person skilled in the art may conceive various modifications and variations within the scope of the appended patent claims, and those modifications and variations should be understood to be naturally encompassed in the technical scope of the present invention.

The present invention is applicable to a vehicle body front structure.

The invention claimed is:

1. A vehicle body front structure that comprises a front side member extending in a front-rear direction on a side of a power unit mounting room located in a front part of a vehicle, the vehicle body front structure comprising:
 a first member fixed to a front end of the front side member and extending in a vertical direction; and
 a second member arranged on an outer side of the first member in a vehicle width direction,
 wherein a front face of the first member is a flat face, and
 the second member is connected to the first member below the front side member, inclines upward as the second member extends rearward relative to the vehicle from a portion at which the second member is connected to the first member, and is also connected to a vehicle body above the front side member.

2. The vehicle body front structure according to claim 1, further comprising:
 a third member arranged on an outer side of the second member in the vehicle width direction and rearward of the second member,
 wherein the third member is connected to a rear end of the second member, inclines upward as the third member extends rearward relative to the vehicle from a portion at which the third member is connected to the second member, and is also connected to the vehicle body above the rear end of the second member.

3. The vehicle body front structure according to claim 2, further comprising:
 a suspension frame arranged below the front side member; and
 a reinforcing member extending in a vehicle front-rear direction between the first member and the suspension frame below the front side member,
 wherein a front end of the reinforcing member is connected to a lower end of the first member, a rear end of the reinforcing member is connected to the vehicle body or the suspension frame, and the reinforcing member extends parallel to an inclined portion of the second member as viewed from above.

4. The vehicle body front structure according to claim 3, wherein the third member inclines upward as the third member extends rearward relative to the vehicle from the portion at which the third member is connected to the second member, further extends in a horizontal direction, and is then connected to the vehicle body, the rear end of the reinforcing member is connected to the suspension frame, the reinforcing member has a first readily-bendable portion and a second readily-bendable portion that are spaced apart from each other in the vehicle front-rear direction and are more bendable than portions therearound, and a third readily-bendable portion that is formed at a portion at which the reinforcing member is connected to the suspension frame and is more bendable than portions therearound, a rear end of the front side member is connected to the vehicle body, the front side member has:

a front portion;

an intermediate portion continuous with a rear side of the front portion;

a rear portion continuous with a rear side of the intermediate portion;

a reinforcing shape formed in each of the front portion and the rear portion and extending in the vehicle front-rear direction; and a fragile shape formed in each of the intermediate portion and a rear end of the rear portion, the fragile shape extending in the vertical direction and being more fragile than portions therearound, a leading end of the front side member, a leading end of the second member, and the first readily-bendable portion of the reinforcing member are arranged at the same position in the vehicle front-rear direction, a boundary between an inclined portion and a horizontal portion of the third member, the fragile shape in the rear end of the rear portion of the front side member, and the third readily-bendable portion of the reinforcing member are arranged at the same position in the vehicle front-rear direction, and the portion at which the third member is connected to the second member, a boundary between the intermediate portion and the rear portion of the front side member, and the second readily-bendable portion of the reinforcing member are located in this order from front.

* * * * *